United States Patent

Sakurai et al.

Patent Number: 5,519,186
Date of Patent: May 21, 1996

[54] INERT GAS ARC WELDING WIRE FOR HIGH CR FERRITIC HEAT-RESISTING STEEL

[75] Inventors: Hideo Sakurai; Takashi Tanaka, both of Futtsu, Japan

[73] Assignee: Nippon Steel Corporation, Tokyo, Japan

[21] Appl. No.: 335,738

[22] PCT Filed: Mar. 3, 1994

[86] PCT No.: PCT/JP94/00344

§ 371 Date: Nov. 9, 1994

§ 102(e) Date: Nov. 9, 1994

[87] PCT Pub. No.: WO94/20258

PCT Pub. Date: Sep. 15, 1994

[30] Foreign Application Priority Data

Mar. 10, 1993 [JP] Japan ............... 5-075057

[51] Int. Cl.⁶ .................... B23K 35/22
[52] U.S. Cl. ........................ 219/146.23
[58] Field of Search ............. 219/146.23, 137 WM, 219/146.1, 146.22, 146.41; 420/64

[56] References Cited

U.S. PATENT DOCUMENTS 3,554,791 1/1971 Johnson et al. ............ 219/146.23
4,487,744 12/1984 DeBold et al. ............. 219/146.23
4,673,123 6/1987 Shin et al. ............... 219/146.23

FOREIGN PATENT DOCUMENTS

| | | |
|---|---|---|
| 61-133365 | 6/1986 | Japan . |
| 62-187596 | 8/1987 | Japan . |
| 62-224481 | 10/1987 | Japan . |
| 63-188492 | 8/1988 | Japan . |
| 1-215490 | 8/1989 | Japan . |
| 5-177384 | 7/1993 | Japan . |
| 5-177383 | 7/1993 | Japan . |
| 5-212582 | 8/1993 | Japan . |

*Primary Examiner*—Clifford C. Shaw
*Attorney, Agent, or Firm*—Kenyon & Kenyon

[57] ABSTRACT

A welding wire which can form a weld metal having excellent high-temperature creep strength, toughness and welding property when used in the inert gas arc welding of a high Cr ferritic heat resisting steel, such as 9 to 12% Cr-based steel used in various generator boilers, chemical pressure vessels and the like. It is characterized by comprising, % by weight, C: 0.03 to 0.12%, Si: not more than 0.5%, Mn: 0.3 to 1.5%, Cr: 8 to 13%, Ni: 0.05 to 1.2%, Mo; 0.3 to 1.6%, W: 0.5 to 2.5%, V: 0.03 to 0.40%, Nb: 0.01 to 0.15%, B: 0.0005 to 0.006%, N: 0.01 to 0.08%, and balance: Fe and unavoidable impurities, the total content of Mo and W being not more than 2.8%.

1 Claim, 2 Drawing Sheets

INERT GAS ARC WELDING WIRE FOR HIGH CR FERRITIC HEAT-RESISTING STEEL

TECHNICAL FIELD

The present invention relates to a filler material suitable for welding of a high-strength heat-resisting steel having high toughness, and more specifically to an inert gas arc welding wire which can form a weld metal having excellent creep properties, toughness and cracking resistance at high temperatures.

The inert gas arc welding is arc welding which is carried out in a gas atmosphere of an inert gas, such as argon or helium, or a gas atmosphere comprising the inert gas and, added thereto, a minor amount of an active gas. It is classified into two types, that is, TIG welding as nonconsumable electrode welding and MIG welding as consumable electrode welding. In TIG welding, a tungsten electrode is used, and a filler material is supplied separately from the electrode. On the other hand, in MIG welding, a welding wire (a filler material), as such, is used as an electrode.

BACKGROUND ART

The development of a ferritic heat-resisting steel as a steel product for high-temperature, high-efficiency energy plants, which has a very high creep strength and is less susceptible to stress corrosion cracking such as is observed in an austenitic stainless steel, has been strongly desired in the art, and such a ferritic heat-resisting steel has begun to be actually used.

As a filler material or a welding wire for use in welding of the above ferrite heat-resisting steel, for example, Japanese Unexamined Patent Publication (Kokai) No. 60-257991 proposes a welding wire for a 9Cr-Mo-base steel, which welding wire comprises C, Si, Mn, Cr, Mo and Ni in respective specified contents with at least one of Nb and V being added thereto in a total content of not more than 0.3%. Further, Japanese Unexamined Patent Publication (Kokai) No. 2-280993 proposes an 8–12Cr-base filler material or welding wire which comprises C, Si, Mn, Cr, Ni, Mo, W, V, Nb, Al and N in respective contents specified so as to give a $Cr_{eq}$ value of 13.

The above conventional filler materials or welding wires, however, cannot be expected to have a markedly improved creep strength and, further, have a drawback that δ ferrite precipitates in a martensitic phase to markedly lower the toughness. The δ ferrite is much softer than martensite as the matrix. A metallic structure comprising a hard martensitic matrix and, dispersed therein, δ ferrite has a very low impact toughness.

DISCLOSURE OF INVENTION

An object of the present invention is to eliminate the above drawbacks of the prior art and to provide a filler material or a welding wire which can form a weld metal having high creep strength and excellent toughness when used in welding of a high Cr ferritic heat-resisting steel.

In order to attain the above object of the invention, the present invention provides an inert gas arc welding wire for a high Cr ferritic heat-resisting steel, characterized by comprising, by weight, C: 0.03 to 0.12%,
Si: not more than 0.5%,
Mn: 0.3 to 1.5%,
Cr: 8 to 13%,
Ni: 0.05 to 1.2%,
Mo: 0.3 to 1.6%,
W: 0.5 to 2.5%,
V: 0.03 to 0.40%,
Nb: 0.01 to 0.15%,
B: 0.0005 to 0.006%,
N: 0.01 to 0.08%, and
balance: Fe and unavoidable impurities, the total content of Mo and W being not more than 2.8%.

The greatest feature of the present invention is that W and B are added and the contents of the Mo and W are specified in the above respective ranges, thereby suppressing the formation of δ ferrite in a weld metal to markedly enhance the creep rupture strength and the toughness. The reasons for the limitation of each ingredient in the present invention will now be described.

C: 0.03 to 0.12%

C should be present in an amount of not less than 0.03% for ensuring the hardenability and strength and should be not more than 0.12% for preventing the deterioration of cracking resistance. The term "cracking" used herein is intended to mean that a weld metal cracks at a high temperature at the time of welding.

Si: not more than 0.5%

Si is added as a deoxidizer and contributes also to an improvement in oxidation resistance. However, when the Si content exceeds 0.5%, the toughness is lowered, so that the upper limit of the Si content is 0.5%.

Mn: 0.3 to 1.5%

Mn is necessary not only for deoxidation purposes but also for maintaining the strength. The lower limit of the Mn content is 0.3% in view of the amount necessary for the deoxidation. On the other hand, the upper limit is 1.5% from the viewpoint of preventing an adverse effect on the toughness.

Cr: 8 to 13%

Cr is a very important element for ensuring the oxidation resistance and the hardenability and should be present in an amount of not less than 8%. The upper limit of the Cr content is 13% from the viewpoint of ensuring the cracking resistance and, at the same time, preventing a remarkable deterioration in toughness due to the precipitation of δ ferrite.

Ni: 0.05 to 1.2%

Ni is an element useful for suppressing the formation of ferrite and reducing embrittlement during use and is indispensable to materials for applications where they are used at a high temperature for a long period of time, such as the welding material of the present invention. Ni should be present in an amount of not less than 0.05% for the purpose of ensuring the above effect. However, the Ni content is limited to not more than 1.2% from the viewpoint of ensuring good high-temperature creep properties.

Mo: 0.3 to 1.6%

Mo serves to enhance the high-temperature strength by solid solution strengthening, thereby enabling the material to be used at a higher temperature under a higher pressure. It should be present in an amount of not less than 0.3% from the viewpoint of enhancing the high-temperature strength, particularly the creep rupture strength on the side of higher temperature and longer period of time, in the copresence of W. However, when the Mo content is excessively high, the welding property is deteriorated and, at the same time, δ ferrite is precipitated to lower the toughness. For this reason, the upper limit of the MO content is 1.6%.

W: 0.5 to 2.5%

W is the best element as a solid-solution strengthening element which contributes to creep strength of a ferritic weld metal. In particular, the effect of improving the creep rupture strength on the side of higher temperature and longer period of time is significant. In order to attain this effect in the copresence of Mo, W should be present in an amount of not less than 0.5%. However, when W is present in an excessive amount, the precipitation of δ ferrite lowers the toughness of the weld metal and, at the same time, deteriorates the weldability, so that the upper limit of the W content is 2.5%.

V: 0.03 to 0.40%

V should be present in an amount of not less than 0.03% for the precipitation thereof as a carbonitride to thereby ensure the strength. However, when the V content exceeds 0.40%, the strength is lowered. For this reason, the upper limit of the V content is 0.40%.

Nb: 0.01 to 0.15%

Nb is an important element for the precipitation thereof as a carbonitride to thereby ensure the strength as with V and, at the same time, refining crystal grains to thereby ensure the toughness. In order to attain this effect, Nb should be present in an amount of not less than 0.01%. However, when the Nb content exceeds 0.15%, the effect is unfavorably unsaturated and, at the same time, the weldability is deteriorated, so that the upper limit of the Nb content is 0.15%.

B: 0.0005 to 0.006%

B serves to improve the high-temperature creep properties by grain boundary strengthening when it is present in an amount of not less than 0.0005%. However, when it exceeds 0.006%, the toughness and the cracking resistance are deteriorated. For this reason, the B content is limited to 0.0005 to 0.006%.

N: 0.01 to 0.08%

N significantly contributes to an improvement in creep resistance in both cases of dissolution in a solid solution form in the matrix and precipitation as a nitride. It should be present in an amount of not less than 0.01% for attaining this effect. However, when the N content exceeds 0.08%, problems occur including the precipitation of a large amount of nitrides to deteriorate the toughness. For this reason, the upper limit of the N content is 0.08%.

In the present invention, the creep strength on the side of higher temperature and longer period of time can be significantly improved by the addition of Mo in combination with W. In this case, when the strength, toughness and weldability are taken into consideration, not only the amount of each of Mo and W added but also the total amount of both elements should be limited. The amount range of MO and W added in combination is expressed as a region surrounded by segments connecting points A, B, C and D in FIG. 1. Each segment will now be described.

The segment AB corresponds to a W content of 0.5%. The effect of improving the creep strength is substantially attained when the W content is not less than 0.5% (in FIG. 1, on the segment AB and a region on the right thereof).

The segment BC corresponds to a Mo content of 0.3%. Also in this case, the effect of improving the creep strength is substantially attained when the Mo content is not less than 0.3% (in FIG. 1, on the segment BC and a region above the segment BC).

The segment CD corresponds to % Mo+% W=2.8. The total content of Mo and W is limited to not more than 2.8% from the viewpoint of ensuring the weldability, toughness and oxidation resistance (in FIG. 1, on the segment CD and a region on the left thereof).

The segment DA corresponds to a Mo content of 1.6%. The Mo content is limited to not more than 1.6% from the viewpoint of ensuring the weldability, toughness and oxidation resistance (in FIG. 1, on the segment DA and a region below the segment DA).

When the amount of Mo and W added is in a region on the right of the segment CD or in a region above the segment DA, at least one of the weldability, toughness and oxidation resistance is deteriorated.

BEST MODE FOR CARRYING OUT THE INVENTION

EXAMPLES

Figure 2:
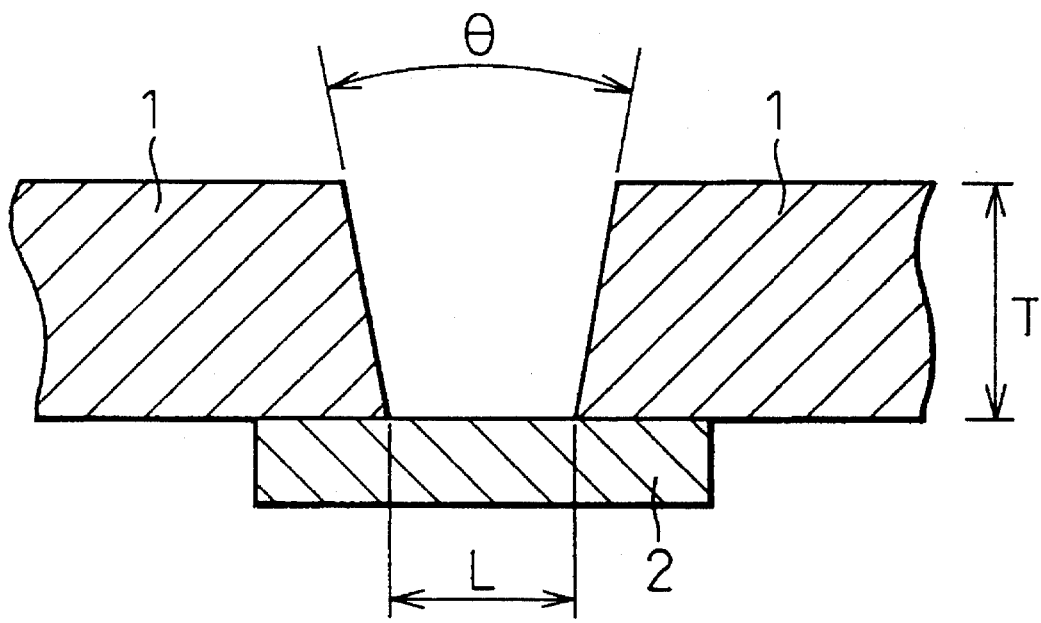
FIG. 2 is a cross-sectional view of the shape of a groove of a weld used in working examples.

TIG welding (wire Nos. TWB1 to TWB9) and MIG welding (wire No. TWB10) of several types of high Cr ferritic heat-resisting steel sheets were carried out using welding wires (diameter: 1 mmφ) comprising chemical ingredients specified in Table 1. Steel sheets used were ASTMA387 Gr22, 9Cr-1Mo steel, 9Cr-1Mo-Nb-V-W steel, 9Cr- 0.5Mo-Nb-V-W steel and 12Cr-Nb-V-W steel. The groove shape is shown in FIG. 2. Steel sheet 1 had a thickness (T) of 20 mm and an end worked so as to have a groove angle (θ) of 40°, and the root gap (L=6 mm) was covered with a backing metal 2 (comprising the same ingredients as steel sheet 1). TIG welding conditions (wire Nos. TWB1 to 9) and MIG welding conditions (wire No. TWB10) are specified in Table 3. The resultant weld metals were subjected to stress relief heat treatment at 740° C. for 4 hr and then subjected to a creep rupture test at a temperature of 600° C. and a stress of 200 MPa and a 2 mm V notch impact test at a temperature of 0° C. The results of these tests and the results of evaluation of the weldability are summarized in Table 2.

Welding wires TWB1 to TWB10 according to the present invention provided weld metals which were free from no δ ferrite precipitated, had a martensitic single phase structure, good toughness and creep rupture properties after stress relief heat treatment and a good welding property.

Welding wires TB11 to TB18 are samples outside the scope of the invention. Comparative wire TB11 is a 2(¼)% Cr-1% Mo-base wire commonly used as a heat-resisting steel in the art, and comparative wire TB12 is a wire having a further improved high-temperature corrosion resistance for a heat exchanger. Both the above comparative wires had much lower creep rupture strength than the wires of the present invention.

TB13 is a 9Cr-1Mo-Nb-V-W-base wire and has a much higher C content than the wires of the present invention, so that cracking occurred at the time of welding. Therefore, the cracking resistance and the impact value were poor.

For TB14, since the N content exceeds the upper limit specified in the present invention, blow holes occurred in the weld metal and, at the same time, the toughness was poor.

For TB15, since both the C and N contents were lower than those of the chemical composition according to the present invention and, at the same time, neither Ni nor B is not contained, the resultant weld metal had low creep strength and lowered toughness due to the occurrence of δ ferrite.

TB16 is a 9Cr-0.5Mo-Nb-V-W-base wire containing Mo, W and B. Since, however, the Mo and W contents are outside the scope of the present invention, the resultant weld metal had low creep rupture strength and lowered toughness due to the occurrence of δ ferrite.

As with TB15, TB17 is a 9Cr-0.5Mo-Nb-V-W-base wire and contains Mo, W and B. Since, however, the Mo and W contents are outside the scope of the present invention, the resultant weld metal had low creep rupture strength and lowered toughness due to the occurrence of δ ferrite.

TB18 is a 9Cr-1Mo-V-Nb-base wire having Mo and W contents falling within the scope of the present invention.

Since, however, the B content is outside the scope of the present invention, hot cracking occurred.

As is apparent from Tables 1 and 2, the welding wires falling within the composition range specified in the present invention are superior to the welding wires outside the composition range specified in the present invention not only in the high-temperature creep property but also in the toughness and weldability.

TABLE 1

| Wire No. | Chemical ingredients of wire (wt. %) | | | | | | | | | | |
|---|---|---|---|---|---|---|---|---|---|---|---|
| | C | Si | Mn | Cr | Mo | W | V | Nb | Ni | B | N |
| Invention | | | | | | | | | | | |
| TWB1 | 0.06 | 0.15 | 0.88 | 8.95 | 0.65 | 2.05 | 0.12 | 0.08 | 0.30 | 0.0060 | 0.031 |
| TWB2 | 0.06 | 0.11 | 1.02 | 8.03 | 0.38 | 2.40 | 0.29 | 0.05 | 0.78 | 0.0058 | 0.047 |
| TWB3 | 0.04 | 0.10 | 0.94 | 8.65 | 0.78 | 1.55 | 0.09 | 0.07 | 0.06 | 0.0015 | 0.062 |
| TWB4 | 0.11 | 0.09 | 0.35 | 9.40 | 0.35 | 0.55 | 0.18 | 0.15 | 0.45 | 0.0007 | 0.078 |
| TWB5 | 0.07 | 0.26 | 1.45 | 8.80 | 0.52 | 1.82 | 0.10 | 0.02 | 0.52 | 0.0035 | 0.040 |
| TWB6 | 0.12 | 0.02 | 0.50 | 9.55 | 1.58 | 0.73 | 0.20 | 0.04 | 0.20 | 0.0018 | 0.012 |
| TWB7 | 0.08 | 0.20 | 1.48 | 12.90 | 1.15 | 1.42 | 0.25 | 0.10 | 0.06 | 0.0052 | 0.065 |
| TWB8 | 0.05 | 0.25 | 1.10 | 10.78 | 1.55 | 1.14 | 0.04 | 0.04 | 0.56 | 0.0020 | 0.055 |
| TWB9 | 0.08 | 0.28 | 1.34 | 9.02 | 0.95 | 0.65 | 0.38 | 0.03 | 0.12 | 0.0038 | 0.023 |
| TWB10 | 0.08 | 0.43 | 1.32 | 8.98 | 0.52 | 1.56 | 0.21 | 0.06 | 0.53 | 0.0006 | 0.048 |
| Comp. Ex. | | | | | | | | | | | |
| TB11 | 0.08 | 0.45 | 0.78 | 2.38 | 1.05 | ... | ... | ... | ... | ... | 0.001 |
| TB12 | 0.07 | 0.36 | 0.68 | 9.12 | 0.98 | ... | ... | ... | ... | ... | 0.001 |
| TB13 | 0.21 | 0.28 | 1.45 | 8.60 | 0.88 | 1.60 | 0.07 | 0.10 | ... | 0.0065 | 0.035 |
| TB14 | 0.03 | 0.10 | 1.35 | 8.93 | 1.45 | 2.20 | 0.05 | 0.03 | 0.50 | ... | 0.095 |
| TB15 | 0.02 | 0.25 | 0.75 | 11.26 | 0.92 | 0.62 | 0.08 | 0.14 | ... | ... | 0.007 |
| TB16 | 0.02 | 0.16 | 0.86 | 10.02 | 1.80 | 0.42 | 0.11 | 0.07 | 0.06 | 0.0075 | 0.073 |
| TB17 | 0.05 | 0.09 | 1.12 | 9.42 | 1.62 | 2.30 | 0.23 | 0.08 | 0.08 | 0.0030 | 0.036 |
| TB18 | 0.08 | 0.21 | 0.65 | 9.80 | 1.03 | 1.25 | 0.05 | 0.06 | 0.03 | 0.0082 | 0.002 |

TABLE 2

| Wire No. | Relationship between Mo and W contents *1 | Creep rupture time (hr) *2 | Impact value vE0° C. (kgf-m) | Base metal of welding | Weldability *3 | Over-all evaluation *4 |
|---|---|---|---|---|---|---|
| Invention | | | | | | |
| TWB1 | o | 5180 | 18.2 | 12Cr—0.5Mo—Nb—V—W steel | o | o |
| TWB2 | o | 4824 | 14.8 | 9Cr—0.5Mo—Nb—V—W steel | o | o |
| TWB3 | o | 3726 | 21.5 | 9Cr—1Mo—Nb—V—W steel | o | o |
| TWB4 | o | 3515 | 20.8 | 9Cr—0.5Mo—Nb—V—W steel | o | o |
| TWB5 | o | 3190 | 19.2 | 9Cr—1Mo—Nb—V—W steel | o | o |
| TWB6 | o | 4353 | 16.3 | 9Cr—0.5Mo—Nb—V—W steel | o | o |
| TWB7 | o | 4780 | 16.8 | 9Cr—1Mo—Nb—V—W steel | o | o |
| TWB8 | o | 3890 | 23.2 | 12Cr—0.5Mo—Nb—V—W steel | o | o |
| TWB9 | o | 4200 | 16.3 | 9Cr—1Mo—Nb—V—W steel | o | o |
| TWB10 | o | 3350 | 10.2 | 9Cr—0.5Mo—Nb—V—W steel | o | o |
| Comp. Ex. | | | | | | |
| TB11 | x | 625 | 9.8 | ASTM A387 Gr22 | o | x |
| TB12 | x | 1380 | 7.8 | 9Cr—1Mo steel | o | x |
| TB13 | o | — | 1.2 | 9Cr—1Mo—Nb—V—W steel | Hot crack | x |
| TB14 | x | 1320 | 3.6 | 9Cr—1Mo—Nb—V—W steel | Blowhole | x |
| TB15 | o | 1892 | 5.8 | 12Cr—0.5Mo—Nb—V—W steel | o | x |
| TB16 | o | 1100 | 2.3 | 9Cr—Mo—Nb—V—W steel | Blowhole | x |
| TB17 | x | 2650 | 7.3 | 9Cr—0.5Mo—Nb—V—W steel | o | x |
| TB18 | o | — | — | 9Cr—1Mo—Nb—V—W steel | Hot crack | x |

Figure 1:
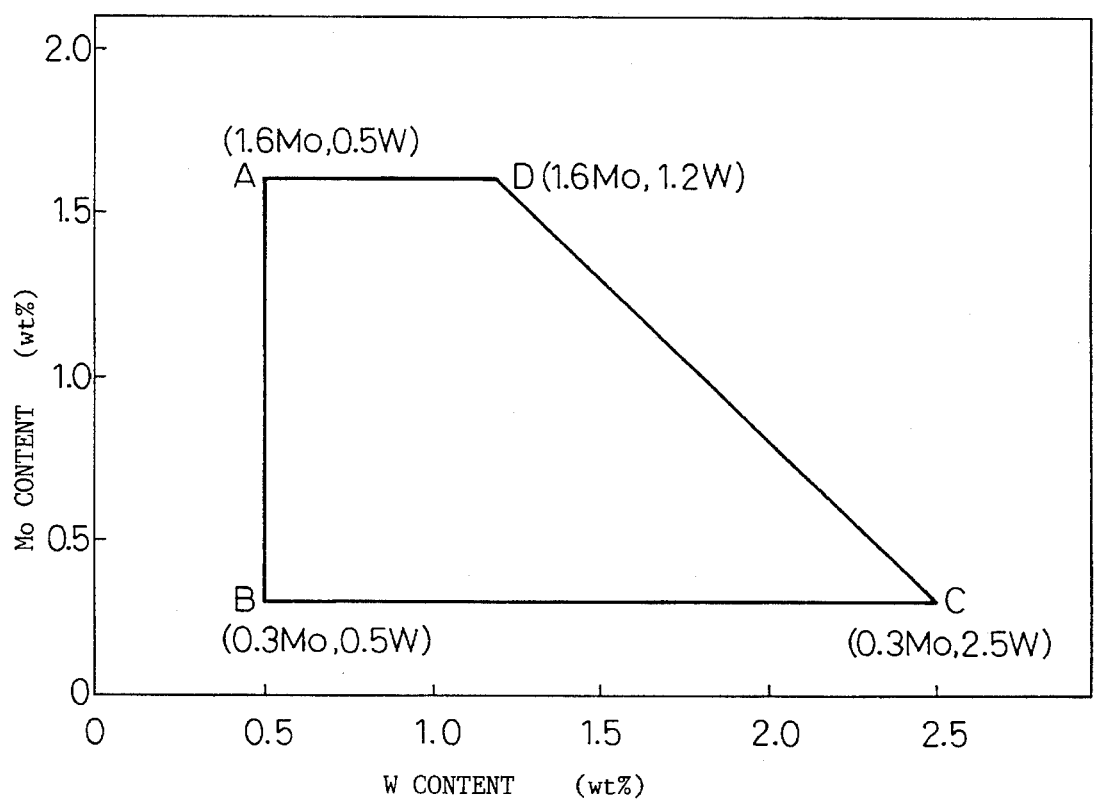
FIG. 1 is a graph showing the amount range of Mo and W added in combination according to the present invention.

(Note)
*1) o: The relationship between Mo and W contents falls within the scope specified in FIG. 1.
x: The relationship between Mo and W contents is outside the scope specified in FIG. 1.
*2) temp.: 600° C., stress: 200 MPa
*3) o: good weldability
*4) o: good
x: poor

TABLE 3

| Current (A) | Voltage (V) | Welding speed (cm/min) | Heat input (kJ/cm) | Preheating and inter-pass temps (°C.) |
| --- | --- | --- | --- | --- |
| 180–220 | 11–12 | 8–12 | 1.1–1.98 | 150–200 |

INDUSTRIAL APPLICABILITY

As described above, as compared with conventional welding wires for 9–12% Cr steels, the filler material or welding wire according to the present invention has a significantly enhanced creep strength at a high temperature and also improved toughness and welding property.

The use of the filler material or welding wire according to the present invention in the welding of 9Cr-base steels for various generator boilers and chemical pressure vessels contributes to a marked improvement in reliability of weld joints.

We claim:

1. An inert gas arc welding wire for a high Cr ferritic heat-resisting steel, characterized by comprising, by weight, C: 0.03 to 0.12%,
Si: not more than 0.5%,
Mn: 0.3 to 1.5%,
Cr: 8 to 13%,
Ni: 0.05 to 1.2%,
Mo; 0.3 to 1.6%,
W: 0.5 to 2.5%,
V: 0.03 to 0.40%,
Nb: 0.01 to 0.15%,
B: 0.0005 to 0.006%,
N: 0.01 to 0.08%, and
balance: Fe and unavoidable impurities, the total content of Mo and w being not more than 2.8%.

* * * * *

UNITED STATES PATENT AND TRADEMARK OFFICE
CERTIFICATE OF CORRECTION

PATENT NO.  : 5,519,186
DATED       : May 21, 1996
INVENTOR(S) : Hideo SAKURAI, et al.

It is certified that error appears in the above-indentified patent and that said Letters Patent is hereby corrected as shown below:

Item [54], in title, change "CR" to --Cr--.

Column 1, line 2, change "CR" to --Cr--.

Column 4, line 16, change "ASTMA387" to --ASTM A387--.

Column 4, lines 31 and 32, change "no $\delta$ ferrite precipitated," to --precipitated $\delta$ ferrite--.

Column 4, line 53, delete "not" at beginning of line.

Column 7, line 18, change "9Cr-base" to --9-12% Cr-base--.

Column 8, last line, change "w" to --W--.

Signed and Sealed this

Eighth Day of October, 1996

Attest:

BRUCE LEHMAN

Attesting Officer

Commissioner of Patents and Trademarks